United States Patent
Chen et al.

(10) Patent No.: US 12,430,728 B2
(45) Date of Patent: Sep. 30, 2025

(54) METHOD FOR LABELING IMAGE OBJECT AND CIRCUIT SYSTEM

(71) Applicant: REALTEK SEMICONDUCTOR CORP., Hsinchu (TW)

(72) Inventors: Yen-Ying Chen, Hsinchu (TW);
Wei-Yuan Hsu, Hsinchu (TW);
Chia-Wei Yu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 362 days.

(21) Appl. No.: 18/134,625

(22) Filed: Apr. 14, 2023

(65) Prior Publication Data
US 2023/0334629 A1    Oct. 19, 2023

(30) Foreign Application Priority Data
Apr. 18, 2022    (TW) .................................. 111114577

(51) Int. Cl.
*G06K 9/00*    (2022.01)
*G06T 5/77*    (2024.01)
(Continued)

(52) U.S. Cl.
CPC .................. *G06T 5/77* (2024.01); *G06T 7/11* (2017.01); *G06T 7/55* (2017.01); *G06V 10/761* (2022.01);
(Continued)

(58) Field of Classification Search
CPC . G06T 2207/20081; G06T 2207/20084; G06T 2207/10028; G06T 7/0012;
(Continued)

(56) References Cited

U.S. PATENT DOCUMENTS

2018/0130193 A1*  5/2018  Mithal .................. G06V 10/44
2018/0330194 A1*  11/2018 Peng .................... G06V 10/454
(Continued)

OTHER PUBLICATIONS

Huan Fu, Mingming Gong, Chaohui Wang, Kayhan Batmanghelich, Dacheng Tao. "Deep Ordinal Regression Network for Monocular Depth Estimation," arXiv:1806.02446v1 [cs.CV], Jun. 6, 2018.
(Continued)

*Primary Examiner* — Alex Kok S Liew
(74) *Attorney, Agent, or Firm* — Li & Cai Intellectual Property (USA) Office (57) ABSTRACT

A method for labeling an image object and a circuit system are provided. In the method, an object classification method is used to segment an image into one or more regions. Each of the regions can be classified into one classification assigned with a classification label. A depth estimation method is used to estimate a depth of each pixel of the image. Whether or not the depth of the pixel matches the classification of the region to which the pixel belongs is determined. When the depth of the pixel matches the classification of the region, a post-processing process is performed on the image based on weights assigned to the regions according to the classification label of the region. Conversely, when the depth of the pixel does not match the classification of the region, the pixel is regarded as noise that does not require the post-processing process.

20 Claims, 7 Drawing Sheets

(51) Int. Cl.
  *G06T 7/11* (2017.01)
  *G06T 7/55* (2017.01)
  *G06V 10/74* (2022.01)
  *G06V 10/764* (2022.01)
  *G06V 10/82* (2022.01)
  *G06V 20/70* (2022.01)

(52) U.S. Cl.
  CPC ............ *G06V 10/764* (2022.01); *G06V 10/82* (2022.01); *G06V 20/70* (2022.01); *G06T 2207/20084* (2013.01)

(58) Field of Classification Search
  CPC ... G06T 7/11; G06T 7/50; G06T 2207/30041; G06T 2207/10016; G06T 2207/10024; G06T 2207/10101; G06T 7/75; G06T 7/0004; G06T 2207/10048; G06T 2207/30132; G06T 7/73; G06T 17/05; G06T 2200/24; G06T 2207/10032; G06T 2207/30184; G06T 2207/30188; G06T 7/0002; G06T 7/593; G06T 7/246; G06T 2207/30196; G06T 5/60; G06T 7/194; G06V 10/82; G06V 10/454; G06V 10/25; G06V 30/194; G06V 10/764; G06V 20/58; G06V 20/653; G06V 40/11
  See application file for complete search history.

(56) References Cited

U.S. PATENT DOCUMENTS

2020/0281454 A1* 9/2020 Refai ............... A61B 1/000096
2022/0292650 A1* 9/2022 Amirghodsi .............. G06T 5/77

OTHER PUBLICATIONS

Changqian Yu, Changxin Gao, Jingbo Wang, Gang Yu, Chunhua Shen, Nong Sang. "BiSeNet V2: Bilateral Network with Guided Aggregation for Real-time Semantic Segmentation," arXiv:2004.02147v1 [cs.CV], Apr. 5, 2020.

* cited by examiner

METHOD FOR LABELING IMAGE OBJECT AND CIRCUIT SYSTEM

CROSS-REFERENCE TO RELATED PATENT APPLICATION

This application claims the benefit of priority to Taiwan Patent Application No. 111114577, filed on Apr. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of labeling an object in an image, and more particularly to a method for labeling an image object by classifying objects in the image and matching pixel depths of the image, and a circuit system thereof.

BACKGROUND OF THE DISCLOSURE

When an imaging device generates an image, a series of image enhancement procedures is performed on the image. For example, an overly bright portion and an overly dark portion of the image are adjusted, and contrast and saturation of the image can also be enhanced. Other image-processing processes include sharpening, spatial noise reduction, color adjustment, etc. These steps for image enhancement are dependent upon results of an object classification in the image.

Conventionally, objects in the image can be segmented, and then the quality of the image can be fine-tuned based on the segmented objects. However, any erroneous classification may result in enhancement of an object that should not be enhanced in the image. Therefore, how to improve and avoid an erroneous classification has always been an important issue in the field of image calibration.

In the conventional technology, a random condition field method has been provided. The random condition field method is a statistical modeling method used to recognize patterns in the image. The random condition field method can be used as a post-processing process on the segmented objects of the image after the object classification. However, calculation of most post-processing processes takes a large amount of operating time and costs.

SUMMARY OF THE DISCLOSURE

In order to improve and avoid an erroneous classification that can cause problems during a post-processing process, the present disclosure provides a method for labeling an image object and a circuit system. One of the objectives is to improve an object classification, so as to prevent enhancement in the post-processing process from being performed on a portion of the image that should not be enhanced.

According to one embodiment of the method for labeling the image object, an image is firstly obtained, and an object classification method is performed for segmenting the image into one or more regions. Each of the regions is classified into a classification and is assigned with a classification label that corresponds to the classification. A depth estimation method is performed to estimate a depth of each of pixels of the image. Afterwards, according to the classification of each of the regions, whether or not the depth of each of the pixels in the region matches the classification of the region to which the pixel belongs is determined. When the depth of any one of the pixels in the region matches the classification of the region to which the pixel belongs, a weight is assigned to the region according to the classification label of the region. Then, the post-processing process is performed on the image according to the weights assigned to the regions of the image. Conversely, any one of the pixels is regarded as noise when the depth of the pixel does not match the classification of the region to which the pixel belongs. The pixel that is regarded as noise can be unprocessed or undergo a low-level post-processing process.

The pixels regarded as noises are assigned with a lower weight. The circuit system relies on the weight of each of the regions to perform the post-processing process, in which the pixels of the region having a higher weight in the image are enhanced and the pixels regarded as noises are not processed or undergo the low-level post-processing process.

Exemplarily, the regions of the image are obtained according to the object classification, and each of the regions indicates an object in the image and is assigned with the classification label. Further, the classification label assigned to each of the regions corresponds to a depth range. When the depth of any one of the pixels exceeds the depth range of the region, the pixel is determined not to match the classification of the region to which the pixel belongs.

In one configuration, a depth difference of each of the regions is obtained according to the respective depths of the pixels of the region are regarded as noises when the depth difference of the region is larger than a difference threshold.

In another configuration, a relative positional relationship is set among the regions that are assigned with different ones of the classification labels, and the pixels that do not match the relative positional relationship are regarded as noises after the depths of the pixels of the regions are compared with each other.

Preferably, the object classification method adopts an image-classification neural network model, and the depth estimation method adopts a depth-estimation neural network model.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to distinguish objects at different depths of an image more accurately such that different degrees of image processing can be performed for different regions, the present disclosure provides a method for labeling an image object and a circuit for performing said method. One of the objectives of the method is to segment the image into multiple regions according to classification of the objects in the image so as to estimate a depth of each of pixels of the image. Accordingly, whether or not the depth of each of the pixels matches the classification of the region to which the pixel belongs can be determined. In this way, the objects can be more accurately classified. After reducing noises of the image, a post-processing process is performed on the image.

Figure 1:
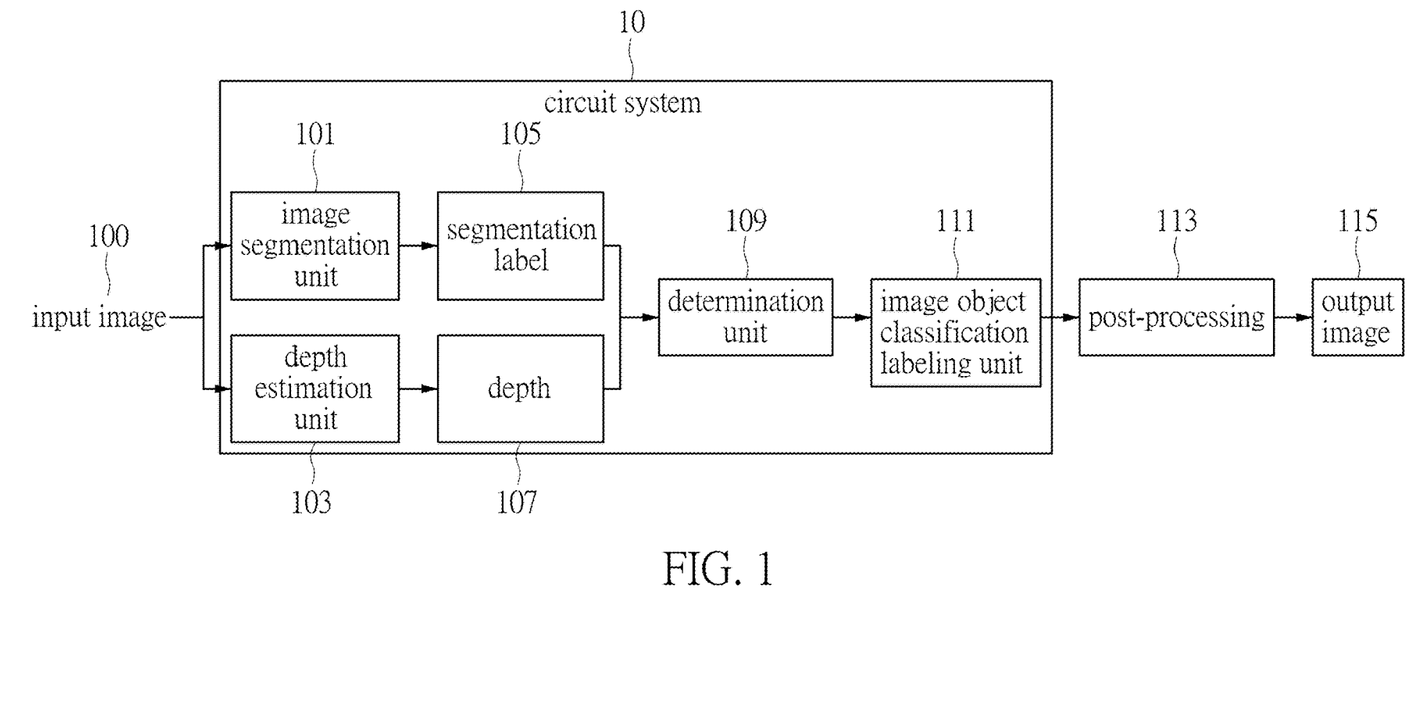
FIG. 1 is a schematic diagram showing a circuit system performing a method for labeling an image object according to one embodiment of the present disclosure.

In addition to using software to implement the method for labeling the image object of the present disclosure, the method can be applied to a circuit system 10 schematically shown in FIG. 1. The circuit system 10 can be an integrated circuit inside an electronic device, or a computer system that performs the method for labeling the image object. The integrated circuit can be an application specific integrated circuit (ASIC) or a system on chip (SoC).

FIG. 1 is a schematic diagram of a circuit system according to one embodiment of the present disclosure. A plurality of functional units can be implemented through firmware in collaboration with hardware of the circuit system 10. Regarding the method for labeling the image object as performed in the circuit system 10, reference can be made to a flowchart of FIG. 2.

Figure 2:
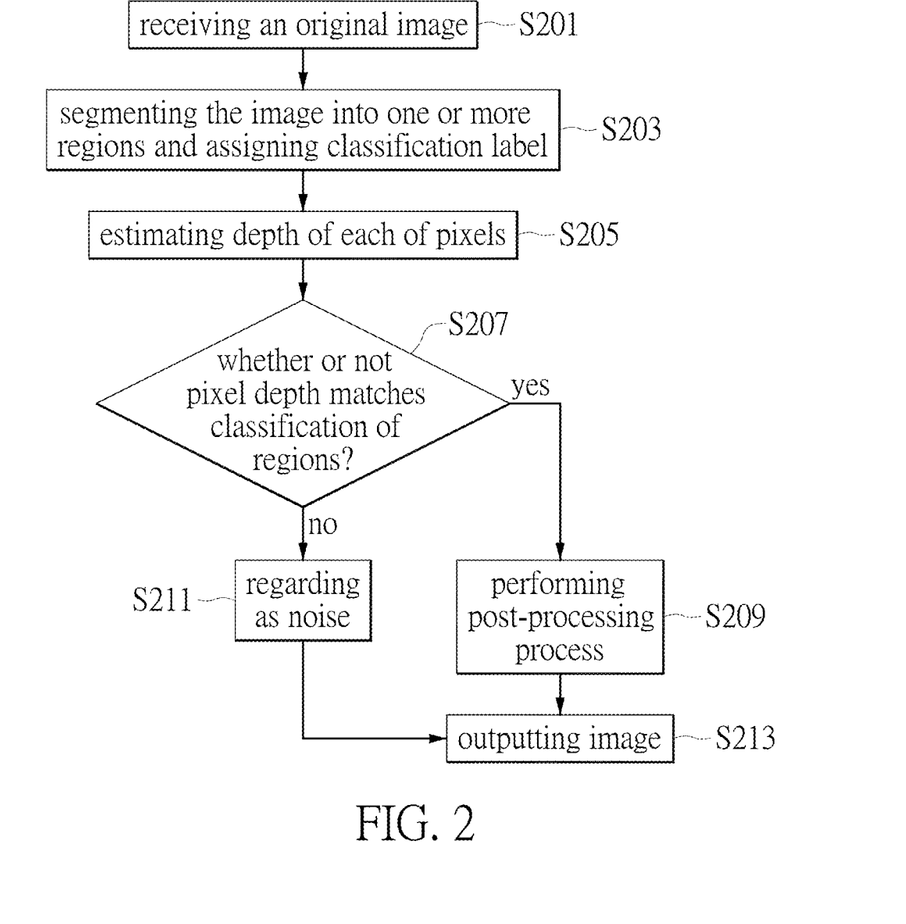
FIG. 2 is a flowchart of the method for labeling the image object according to one embodiment of the present disclosure.

In the beginning, the circuit system 10 receives an input image 100 that can be an original image (step S201). Through the circuit system 10 (i.e., through the functional units), recognition and classification of the image object, pixel depth estimation, and noise reduction are performed. After that, the objects that are recognized in the image can be labeled. Then, the image is processed by a post-processing process after the labeled objects are assigned with different weights.

According to one embodiment of the present disclosure, an image segmentation unit 101 is used to segment the input image 100 into one or more regions. Based on object features in a database, an object classification method is performed for recognizing and classifying the objects in the image through an image recognition technology. In another embodiment, an image-classification neural network model can be adopted in the object classification method. A neural network technology is used to train an object classification model based on a large amount of image data, so that the objects in the image can be recognized and classified. The image can be segmented into one or more regions based on the objects that are recognized. It should be noted that only one region is in the image if there is no object to be recognized. Each of the regions is classified into a classification, and is assigned with a classification label 105 (step S203).

It is worth noting that, in the process of object recognition and classification, shapes, colors, depths, positions and/or a relative relationship of foreground and background are the features that are referred to for performing a calculation in the process. Therefore, in the method for labeling the image object, the pixels or the regions with erroneous determination can be excluded during the process of object recognition and classification. In the process of image segmentation, the action of segmenting the image refers to labeling the pixels of the image. The image can be subdivided into sub-regions, and this process allows the pixels that have the same image features to be assigned with the same label. One of the objectives of the labeling process is to simplify or change an expressive form of the image, so that the image can be easily analyzed and recognized. The common image segmentation methods are, for example, a thresholding method, a clustering method (e.g., a K-means algorithm), a histogram method (e.g., Otsu's method), a watershed method, a level set method, a wavelet based image segmentation method, or other kinds of neural-network-based depth learning algorithms (such as a semantic segmentation method and an instance segmentation method).

On the other hand, the circuit system 10 uses a depth estimation unit 103 to estimate a depth of each of the pixels of the input image 100 by a depth estimation method. Therefore, a depth 107 of each of the pixels can be obtained (step S205). It should be noted that the pixels undergoing the depth estimation method can be selected through a sampling process. According to one embodiment of the present disclosure, the depth of the pixel can be estimated by capturing multiple images covering different positions of the same object. That is, at least two images taken of a target object from different angles of view are obtained for the purpose of depth estimation. Then, two pixels that correspond to the same position of the target object in the two or more images are used for calculating a disparity between the two or more pixels at every position of the two or more images. The depths that correspond to the different positions of the target object in the image can therefore be obtained. In another embodiment, the depth estimation method may adopt a depth-estimation neural network model. Through the neural network technology, a model for estimating the depth of each of the pixels of the image can be trained based on a large amount of image data, and such a neural network model of depth estimation can be used for estimating the depths of the pixels of the various images.

It should be noted that the depth estimation method enables a process of inputting one or more digital images and calculating a distance between a viewpoint and a surface of an object in a scene. In addition to the above-mentioned neural-network-based depth learning algorithms, other common depth estimation algorithms include a stereo matching method. In the stereo matching method, a pair of left and right images that are captured at the same time and undergo a limit calibration are inputted. Then, the pair of left and right images undergo several processes (such as a matching cost computation, a cost aggregation, a disparity computation and a disparity refinement), so as to acquire depth information of the scene. In this regard, reference can be made to FIG. 4.

After acquiring the classification label 105 and the pixel depth 107 with respect to each of the regions of the image, in the circuit system 10, a determination unit 109 relies on the classifications of the regions to determine whether or not the depth of each of the pixels matches the classification of the region to which the pixel belongs (step S207). In the step S207, if the depth of any pixel does not match the classification of the region to which the pixel belongs (no), the pixel is regarded as noise (step S211); otherwise, the pixel that matches the classification of the region is labeled with a classification label by an image object classification labeling unit 111. In the following step, when the depths of the pixels match the classification of the region to which the pixels belong (yes), a post-processing process 113 is executed by the circuit system 10 to process the region that accomplishes the matching. The post-processing process is performed on each of the regions of the image after a weight is assigned to each of the regions according to the classification labels with respect to the regions (step S209). Lastly, an output image 115 is generated after the post-processing process (step S213).

According to one embodiment of the present disclosure, in a process of determining whether or not the pixels match the depth of the region to which the pixels belong, the determination unit 109 determines that the pixels do not match the classification of the region when the depth of any one of the pixels in the region exceeds a depth range of the region, and the depth range corresponds to the classification label of the region. In each of the regions of the image, a depth difference thereof is obtained according to the depths of the pixels of the region. The depth difference refers to a difference of the depths of one pixel having a larger depth and another pixel having a smaller depth in the region of the image. According to the determination, the pixels are regarded as noises when the depth difference of the region is larger than a difference threshold. Further, a relative positional relationship is obtained among the regions that are assigned with different classification labels, and the pixels are regarded as noises if the pixels do not match the relative positional relationship after the depths of the pixels of the regions are compared with each other. Still further, the image includes some small regions to be classified, and the depths of the pixels within the small regions should be within a consistent depth range. The pixels with abnormal depths can be regarded as noises.

For example, an image may include an object that has an absolute location (such as the sky, clouds or mountains that are situated at a distant position in the scene). Since the pixels of the regions having these objects (labeled with specific classification labels) should have larger depth values, the classification labels of the pixels with smaller depth values within these regions can be modified as noises.

In another example, the objects (such as a human face or a ball) within the small regions are not likely to have a large depth difference in the scene. As such, if the pixels of the objects have large depth differences in such regions, the classification labels of the pixels of the objects may be modified as noises.

Furthermore, multiple objects in a scene should have front-and-back positional relationships between one another. For example, the plants should be in front of the sky, and a person in the foreground should be in front of a building in the background of the scene. However, if the pixels of an object in the foreground have too large a depth value, the classification labels of the pixels are similarly modified as noises. Afterwards, the appropriate weights can be assigned to the regions according to the classification labels of the regions. In one example, if the sharpness of the grass in an image is configured to be increased, while the sharpness of the sky is to be decreased at the same time, a larger weight can be assigned to the grass and a smaller weight can be assigned to the sky when the image undergoes a sharpening process in the post-processing process.

According to a determination result made by the determination unit 109, when the depths of the pixels do not match the depth of the region to which the pixels belong, the pixels regarded as noises can be ignored or undergo a low-level post-processing process. Alternatively, the pixels regarded as noises can be assigned with lower weights. The circuit system relies on the weight of each of the regions to perform the post-processing process, in which the pixels of the region having a higher weight in the image are enhanced but the pixels to be regarded as noises are ignored or undergo a low-level post-processing process. A weight array is formed when each of the regions of the image is assigned with a specific weight. The circuit system performs the post-processing process after applying the weight array to the image.

Figure 3:
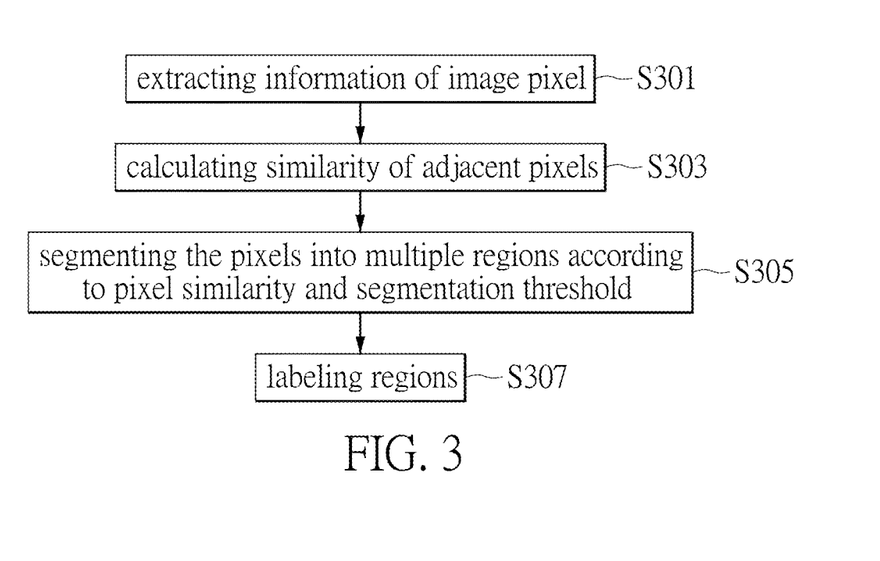
FIG. 3 is a flowchart illustrating a process of segmenting an image in the method for labeling the image object according to one embodiment of the present disclosure.

Reference is made to FIG. 3, which is a flowchart illustrating a process of segmenting the image and labeling the objects in the image in the object classification method according to one embodiment of the present disclosure.

When an original image is obtained, information of image pixels can be extracted (step S301). After that, similarities between adjacent ones of the pixels can be calculated (step S303). The multiple pixels of the image can be segmented into one or more regions according to the pixel similarity and a segmentation threshold preset in the circuit system (step S305). Each of the regions is then labeled (step S307).

The pixel similarity is used as a basis for segmenting the image, and the pixel similarity can be defined based on different features of the pixels of the image. For example, the feature of each of the pixels can be a grayscale or a color value of the pixel, a texture or a geometric structure of the pixel within a small region, or movement or deformation of the region to which the pixel belongs. The corresponding segmentation algorithm can include, for example, a threshold-based segmentation method that is based on a grayscale distribution graph, a region-based segmentation method, and a motion-based segmentation method.

Figure 4:
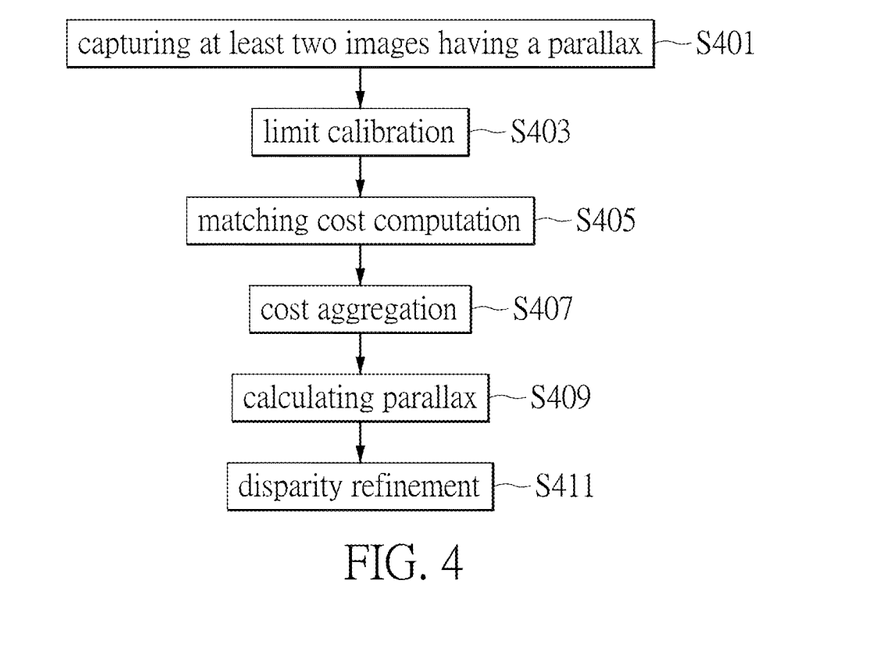
FIG. 4 is a flowchart illustrating a process of depth estimation in the method for labeling the image object according to one embodiment of the present disclosure.

In the process of estimating the depths of the pixels, further reference can be made to a flowchart shown in FIG. 4.

In this process, at least two images having a disparity are taken from different angles of view (step S401). Next, a limit calibration is performed on the images (step S403). The limit calibration is used to calibrate the image of a target object that is taken by a camera, so as to obtain the accurate images with a disparity.

After that, a matching cost computation is performed (step S405). The matching cost computation is used to calculate the depth of each of the pixels of the original image, in which all possible disparities of the two images are used to match costs of the pixels in the images. The costs of the pixels are stored in a three-dimensional array that is usually referred to as a disparity space image (DSI). The disparity space image is used for excluding the noises that do not need to be matched, so that an accuracy of depth calculation can be improved.

Then, a cost aggregation is performed (step S407). The cost aggregation process is used to aggregate the results obtained by the above-mentioned matching cost computation for acquiring an accumulated cost of disparities in each of positions in the image. The cost aggregation process can reduce impact of the noises (e.g., the pixels with abnormal depths), so as to improve an accuracy of matching.

Next, a disparity computation is performed (step S409) after performing the above processes of matching cost computation and cost aggregation. An optimal pixel is selected within a disparity searching range to serve as a reference for disparity calculation. The depth of the pixel can be accurately estimated after a final disparity refinement (step S411). The depth of each of the pixels of the image is obtained by calculating the disparity. The disparity is calculated by acquiring at least left and right images relating to the same position. However, the disparity may still have some problems such as errors caused by noises or mismatching. Therefore, a graph relating to the disparity between the images still needs to be optimized by methods such as interpolation, subpixel enhancement, refinement and image filtering.

Figure 5A:
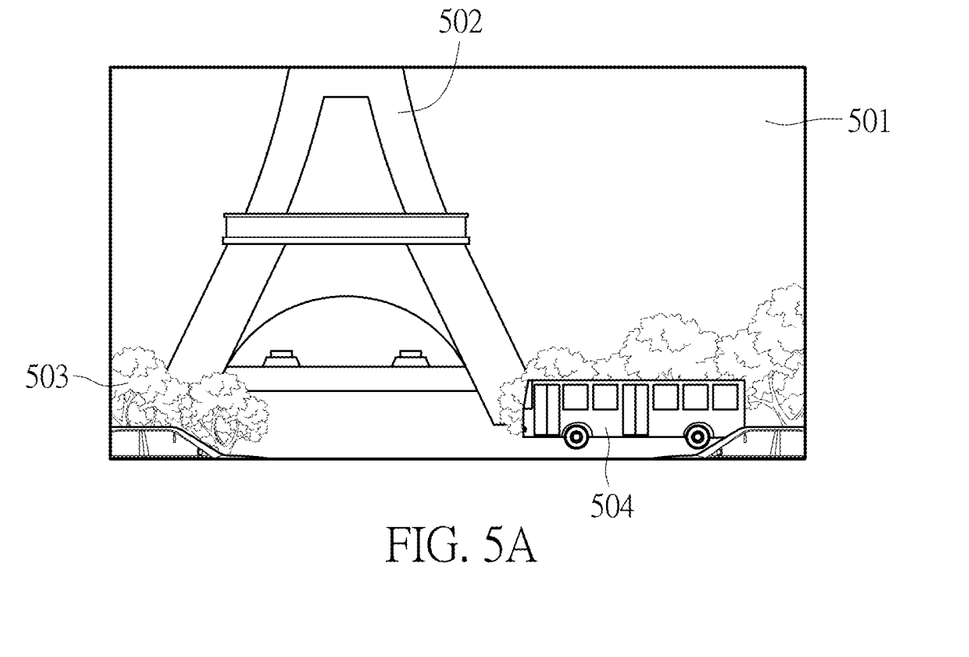
FIG. 5A and FIG. 5B show an example of image segmentation according to one embodiment of the present disclosure.
Figure 5B:
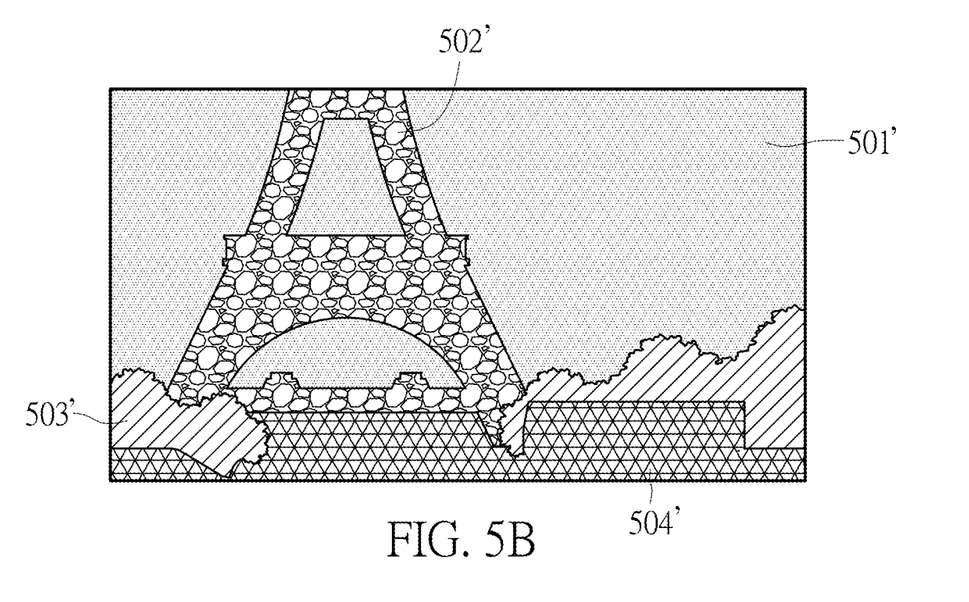

FIG. 5A and FIG. 5B are schematic diagrams showing an example of image segmentation in an object classification method according to one embodiment of the present disclosure.

FIG. 5A shows an original image. In an exemplary example of a simple classification, the sky in the background of the image can be regarded as a first object 501, a tower is regarded as a second object 502, trees on the left and right sides are taken as a third object 503, and a car in the foreground is regarded as a fourth object 504. According to the features and similarities of the pixels of the image, the pixels of the image can be classified into one or more regions. As shown in FIG. 5B, after the noises are excluded as shown in the above embodiments, the image is segmented into a first object segmented region 501' that corresponds to the sky, a second object segmented region 502' that corresponds to the tower, a third object segmented region 503' that corresponds to the trees on the left and right sides of the image, and a fourth object segmented region 504' that corresponds to the car in the foreground of the image.

Figure 6A:
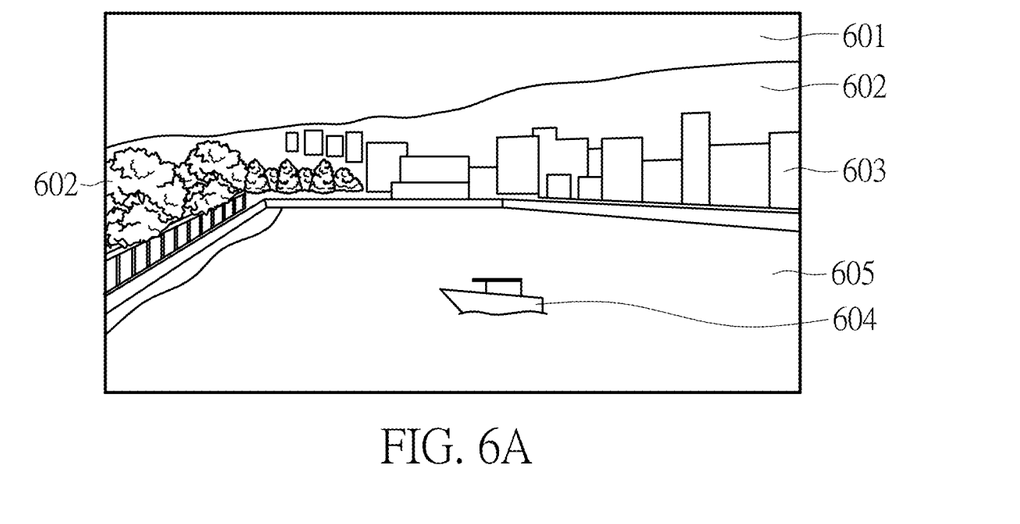
FIG. 6A and FIG. 6B show an example of image segmentation according to another embodiment of the present disclosure.
Figure 6B:
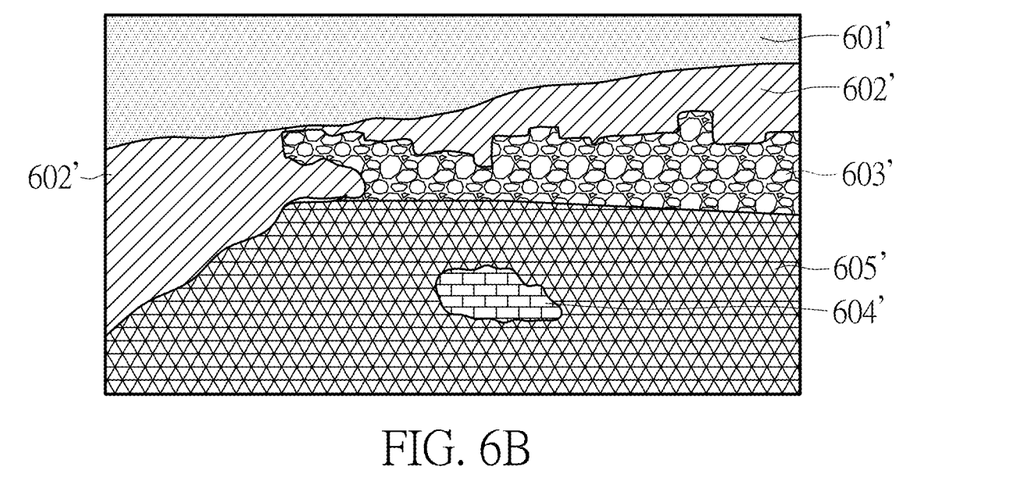

FIG. 6A and FIG. 6B are schematic diagrams showing an example of image segmentation according to another embodiment of the present disclosure.

FIG. 6A is a schematic diagram showing a first object 601 (indicating the sky), a second object 602 (indicating distant mountains and trees), a third object 603 (indicating a row of houses), a fourth object 604 (indicating a boat in a lake), and a fifth object 605 (indicating the lake). FIG. 6B is a schematic diagram showing segmented regions that are obtained by an object classification process according to the features and similarities of the pixels of the image when the object classification method is operated. For example, based on the pixel similarities, the regions can be distinguished into a first object segmented region 601' (indicating the sky), a second object segmented region 602' (indicating the distant mountains and trees), a third object segmented region 603' (indicating the row of houses), a fourth segmented region 604' (indicating the boat in the lake), and a fifth object segmented region 605' (indicating the lake).

In the method for labeling the image object, referring to the segmented regions shown in FIG. 5B and FIG. 6B, each of the segmented regions is assigned with a specific classification label. In the post-processing process, weights are assigned to the regions according to practical requirements. For example, for the improved object classification of the image, a higher weight can be assigned to the region that corresponds to a classification label of the sky if the sky is configured to be enhanced. The adjustment of saturation, contrast, sharpness and color temperature, noise reduction and/or super resolution in the post-processing process can be performed on the region for purposes of enhancing the sky.

Further, the pixels are classified according to the depths of the pixels. The image can be roughly classified into a distant scene, a middle scene and a near scene according to different depth ranges of the regions in the image. References are made to FIG. 7A and FIG. 7B, which are schematic diagrams showing depth estimation according to one embodiment of the present disclosure.

Figure 7A:
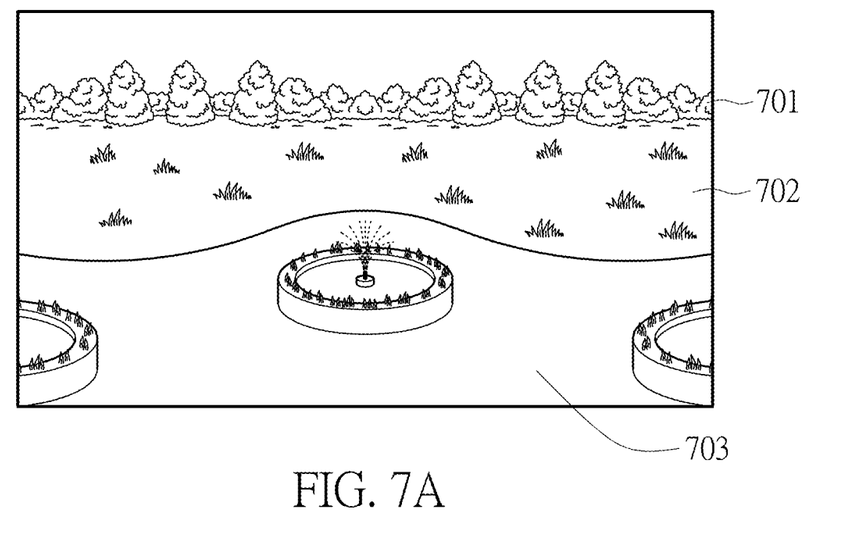
FIG. 7A and FIG. 7B are schematic diagrams showing depth estimation according to one embodiment of the present disclosure.
Figure 7B:
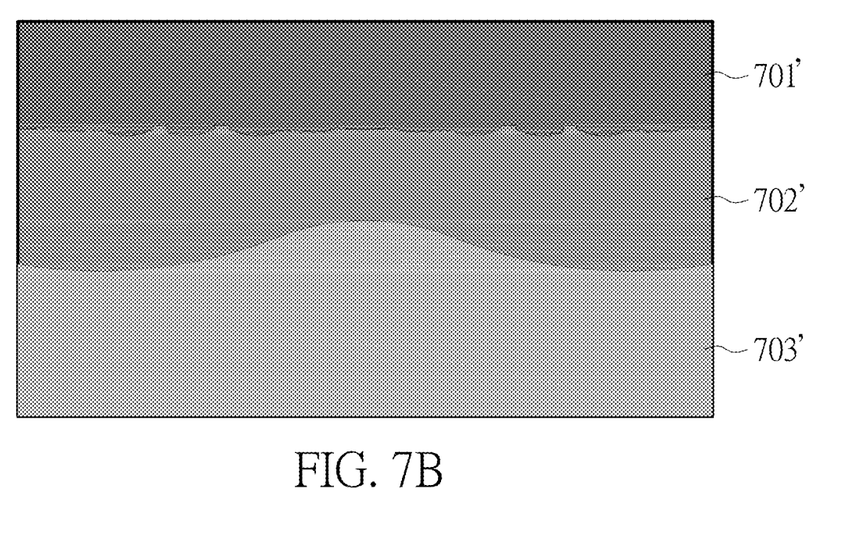

In FIG. 7A, a distant scene 701 indicates a forest, a middle scene 702 indicates a lawn, and a near scene 703 indicates a garden. The distant scene 701, the middle scene 702 and the near scene 703 have different depths (each of which is different in depth range). The image is processed based on the different depths. Afterwards, as shown in FIG. 7B, there are three regions with different depths (i.e., a distant scene depth 701', a middle scene depth 702' and a near scene depth 703') in the image.

Figure 8A:
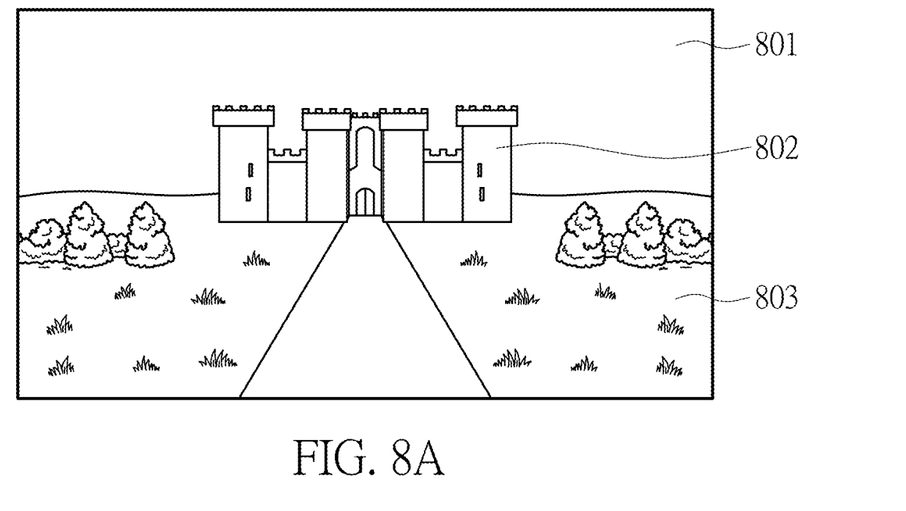
FIG. 8A and FIG. 8B are schematic diagrams showing depth estimation according to another embodiment of the present disclosure.
Figure 8B:
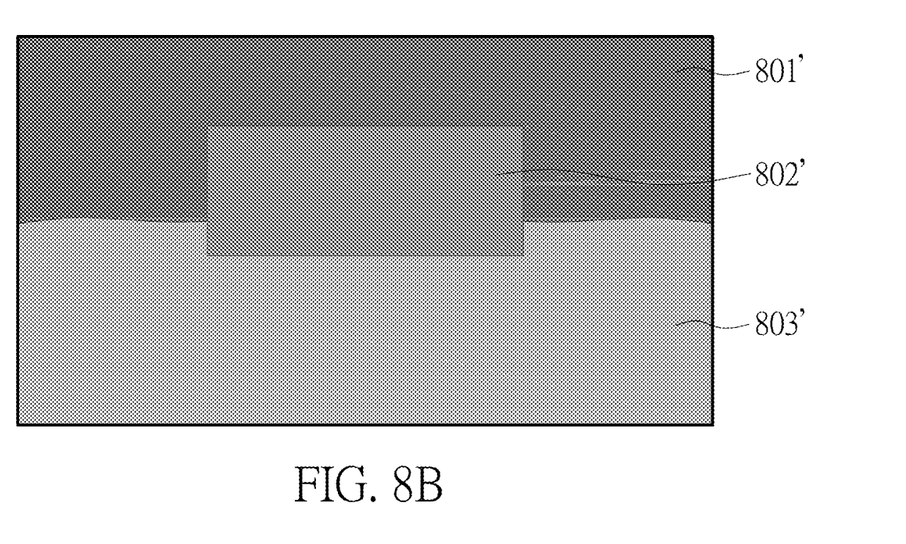

FIG. 8A and FIG. 8B are schematic diagrams showing depth estimation according to another embodiment of the present disclosure.

In FIG. 8A, the sky is a distant scene 801, a castle is a middle scene 802, and a front lawn and a path belong to a near scene 803. Through object classification, as shown in FIG. 8B, the image can be divided into three regions with different depths (i.e., a distant scene depth 801', a middle scene depth 802' and a near scene depth 803').

As discussed above, the objects in the image can be classified for forming the regions, and the depths of the pixels of the regions can be referred to for excluding the noises that may cause the erroneous determination. It should be noted that the depth differences of the objects can be obtained based on the front-and-back positional relationships between one another. If the depth of any pixel fails to match the classification of the region to which the pixel belongs, the pixel will be regarded as noise since the depths of the pixels within the same region should be consistent. That is, the pixel having too large a depth difference as compared with other pixels will be regarded as noise since the depth differences of the depths of the pixels within a small region should not be too large.

After segmenting the image into multiple regions and matching the depths of the pixels in each of the regions, the various objects in the image can be assigned with different classification labels in a more accurate manner. Afterwards, the various objects in the image can also be individually processed in the post-processing process. Furthermore, the image can be optimized through a spatial filter and a temporal filter, so as to achieve the purpose of smoothing boundaries among the regions. In this way, any side effect in the post-processing process can be prevented.

In summation, in the method for labeling the image object and the circuit system provided by the present disclosure, an intelligent model can be used to estimate the depths of the pixels of the image and to classify the objects in the image. Then, whether or not the depths of the pixels of the image match the classifications of the regions is determined, so as to ensure that the objects identified in the image match properties of the physical world. The determination is also fed back to the intelligent model for further modification. One of the objectives of the intelligent model is to accurately classify the objects in the image and segment the image for the subsequent post-processing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for labeling an image object, which is performed in a circuit system, comprising:
   receiving an image;
   using an object classification method to segment the image into one or more regions, classifying each of the regions into a classification, and assigning a classification label to each of the regions;
   using a depth estimation method to estimate a depth of each of pixels of the image;
   determining, according to the classification of each of the regions, whether or not the depth of each of the pixels in the region matches the classification of the region to which the pixel belongs; and
   assigning, by the circuit system, weights to the regions according to the classification label of each of the regions when the depth of any one of the pixels in the region matches the classification of the region to which the pixel belongs, and performing a post-processing process upon the image based on the weights assigned to the regions;
   wherein any of the pixels is regarded as noise when the depth of the pixel does not match the classification of the region to which the pixel belongs.

2. The method according to claim 1, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

3. The method according to claim 1, wherein the regions of the image are obtained according to an object classification, and each of the regions indicates an object in the image and is assigned with the classification label.

4. The method according to claim 3, wherein, in the circuit system, the classification label that is assigned to each of the regions corresponds to a depth range; wherein, when the depth of any one of the pixels in the region exceeds the depth range of the region, the pixel is determined not to match the classification of the region to which the pixel belongs.

5. The method according to claim 4, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

6. The method according to claim 1, wherein, in the circuit system, a depth difference of each of the regions is obtained according to the respective depths of the pixels of the region, and the pixels are regarded as noises when the depth difference of the region is larger than a difference threshold.

7. The method according to claim 1, wherein a relative positional relationship is set among the regions that are assigned with different ones of the classification labels, and the pixels that do not match the relative positional relationship are regarded as noises after the depths of the pixels of the regions are compared with each other.

8. The method according to claim 1, wherein, in the object classification method, similarities between adjacent ones of the pixels of the image are calculated, and then the pixels are classified according to the similarities and a segmentation threshold, so as to segment the image into the one or more regions.

9. The method according to claim 1, wherein the step of estimating the depth of each of the pixels of the image includes:
   obtaining two pixels respectively from two images that are taken for a same target object, for each position of the target object; and
   calculating a disparity between the two pixels that correspond to each position in the two images, so as to obtain the depth of each of the positions.

10. The method according to claim 9, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

11. A circuit system, characterized in that the circuit system operates a method for labeling an image object, wherein the method comprises:
   receiving an image;
   using an object classification method to segment the image into one or more regions, classifying each of the regions into a classification, and assigning a classification label to each of the regions;

using a depth estimation method to estimate a depth of each of pixels of the image;

determining, according to the classification of each of the regions, whether or not the depth of each of the pixels in the region matches the classification of the region to which the pixel belongs; and assigning, by the circuit system, weights to the regions according to the classification label of each of the regions when the depth of any one of the pixels in the region matches the classification of the region to which the pixel belongs, and performing a post-processing process upon the image based on the weights assigned to the regions;

wherein, any of the pixels is regarded as noise when the depth of the pixel does not match the classification of the region to which the pixel belongs.

12. The circuit system according to claim 11, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

13. The circuit system according to claim 11, wherein the classification label that is assigned to each of the regions corresponds to a depth range; wherein, when the depth of any one of the pixels in the region exceeds the depth range of the region, the pixel is determined not to match the classification of the region to which the pixel belongs; wherein a depth difference of each of the regions is obtained according to the respective depths of the pixels of the region, and the pixels are regarded as the noises when the depth difference of the region is larger than a difference threshold; wherein a relative positional relationship is set among the regions that are assigned with different ones of the classification label, and the pixels that do not match the relative positional relationship are regarded as noises after the depths of the pixels of the regions are compared with each other.

14. The circuit system according to claim 13, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

15. The circuit system according to claim 11, wherein the object classification method adopts an image-classification neural network model.

16. The circuit system according to claim 11, wherein, in the object classification method, similarities between adjacent ones of the pixels of the image are calculated, and then the pixels are classified according to the similarities and a segmentation threshold, so as to segment the image into the one or more regions.

17. The circuit system according to claim 16, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

18. The circuit system according to claim 11, wherein the depth estimation method adopts a depth-estimation neural network model.

19. The circuit system according to claim 11, wherein the step of estimating the depth of each of the pixels of the image includes:

obtaining two pixels respectively from two images that are taken for a same target object, for each position of the target object; and calculating a disparity between the two pixels that correspond to each position in the two images, so as to obtain the depth of each of the positions.

20. The circuit system according to claim 19, wherein the pixels regarded as noises are assigned with a lower weight; wherein the circuit system relies on the weight of each of the regions to perform the post-processing process, in which the pixels of the region having a higher weight in the image are enhanced and the pixels regarded as noises are not processed or undergo a low-level post-processing process.

* * * * *